United States Patent [19]

Irimajiri et al.

[11] Patent Number: 4,703,824
[45] Date of Patent: Nov. 3, 1987

[54] THREE-WHEELED VEHICLE

[75] Inventors: Shoichiro Irimajiri, Mie; Takeshi Kawaguchi, Saitama, both of Japan

[73] Assignee: Honda Giken Kogyo Kabushiki Kaisha, Tokyo, Japan

[21] Appl. No.: 610,980

[22] Filed: May 16, 1984

[30] Foreign Application Priority Data

May 20, 1983 [JP] Japan .................................. 58-87694
May 20, 1983 [JP] Japan .................................. 58-87695

[51] Int. Cl.⁴ ......................... B62D 61/06; B62K 5/08
[52] U.S. Cl. .................................... 180/215; 180/210
[58] Field of Search ............... 180/215, 212, 210, 211, 180/213; 280/239, 267, 282

[56] References Cited

FOREIGN PATENT DOCUMENTS 402926  1/1921  Fed. Rep. of Germany ...... 180/215

Primary Examiner—Henry A. Bennett
Attorney, Agent, or Firm—Lyon & Lyon

[57] ABSTRACT

A three-wheeled vehicle has a pair of right and left wheels provided at either end of the vehicle body and a single wheel provided at the other end of the vehicle body. The pair of wheels are spaced from each other laterally with respect to the vehicle body. The three-wheeled vehicle is further provided with a steering mechanism for steering the pair of wheels, and a mechanism which cooperates with the steering mechanism for displacing the single wheel substantially laterally with respect to the vehicle body and in the direction opposite to the direction of turning of the vehicle caused by the steering operation of the steering mechanism. In another embodiment the single wheel is also pivoted in a direction opposite the turning of the pair of wheels.

9 Claims, 5 Drawing Figures

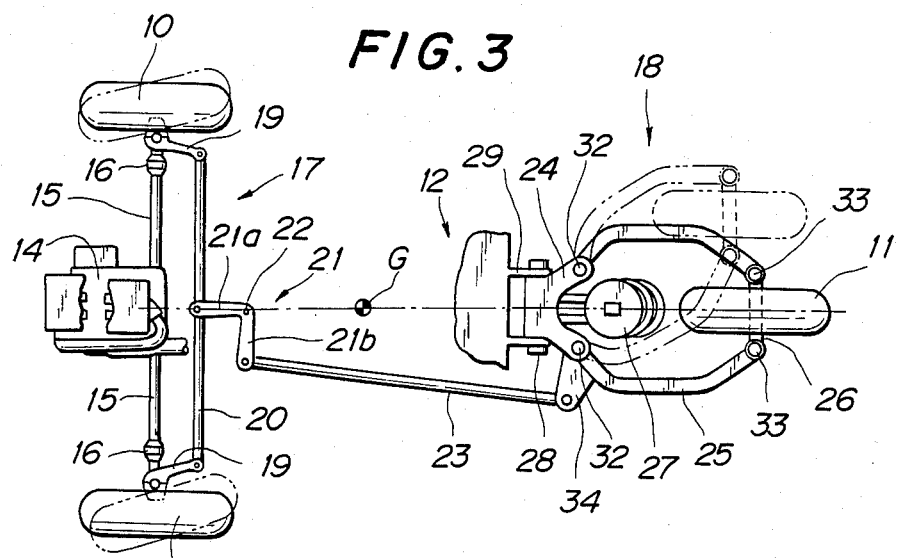
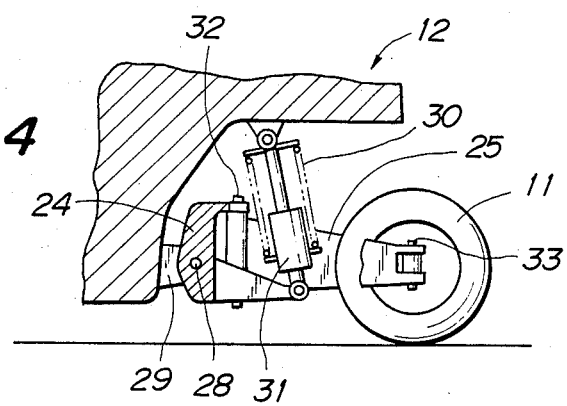
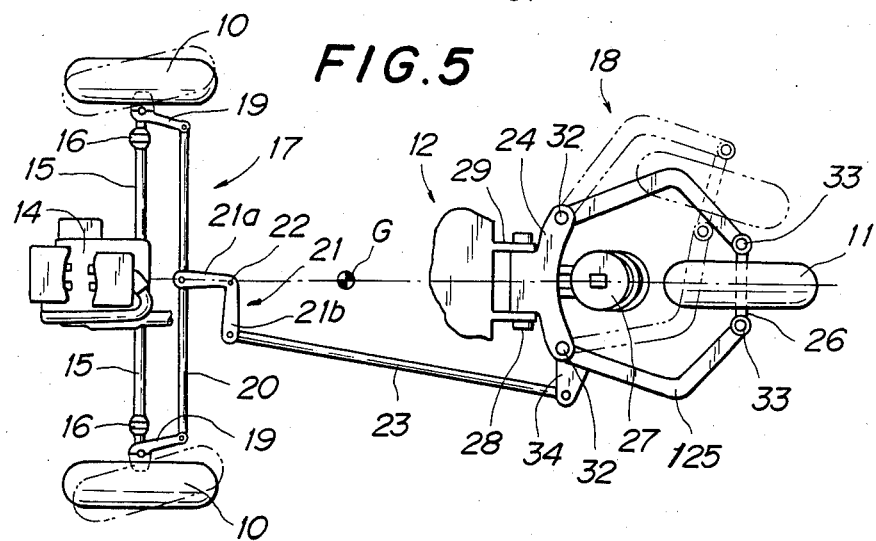

THREE-WHEELED VEHICLE

The present invention relates to a three-wheeled vehicle and, more particularly, to a three-wheeled vehicle which has a pair of right and left wheels provided at either the front end or the rear end thereof and a single wheel provided at the other end.

A conventional three-wheeled vehicle of such type generally has a simple and light-weight structure as compared with a four-wheeled vehicle. The result is that such a vehicle can decrease fuel consumption and cost, and has been heretofore employed in a practical use for a compact vehicle in which one or two occupants ride. However, not all previous three-wheeled vehicles have satisfactory turning characteristics.

Accordingly, it is an object of the present invention to provide a three-wheeled vehicle which has excellent turning characteristics while maintaining the advantages peculiar to a three-wheeled vehicle.

More specifically, it is another object of the present invention to provide a three-wheeled vehicle which can turn at a smaller radius and has comfortable turning characteristics.

According to the present invention, there is provided a three-wheeled vehicle which comprises a pair of right and left wheels provided at either the front end or the rear end of the vehicle body, the pair of wheels being spaced from each other laterally with respect to the vehicle body, a single wheel provided at the other end of the vehicle body, a steering mechanism for steering the pair of wheels, and a mechanism which cooperates with the steering mechanism for displacing the single wheel substantially laterally with respect to the vehicle body and in the direction opposite to the direction of turning of the vehicle caused by the steering operation of the steering mechanism.

The above and further objects, details and advantages of the present invention will become apparent from the following detailed description of a preferred embodiment thereof, when read in conjunction with the accompanying drawings.

FIG. 3 is a view showing the disposition of a power unit, a front wheel steering mechanism and a rear wheel servo mechanism of the three-wheeled vehicle in FIG. 1.

FIG. 4 is a partial side sectional view of the rear wheel servo mechanism in FIG. 3; and FIG. 5 is a view showing the disposition of a power unit, a front wheel steering mechanism and a rear wheel servo mechanism of a three-wheeled vehicle according to a modification of the preferred embodiment in shown FIG. 3.

The preferred embodiment of the present invention will now be described in more detail with reference to the accompanying drawings.

Figure 1:
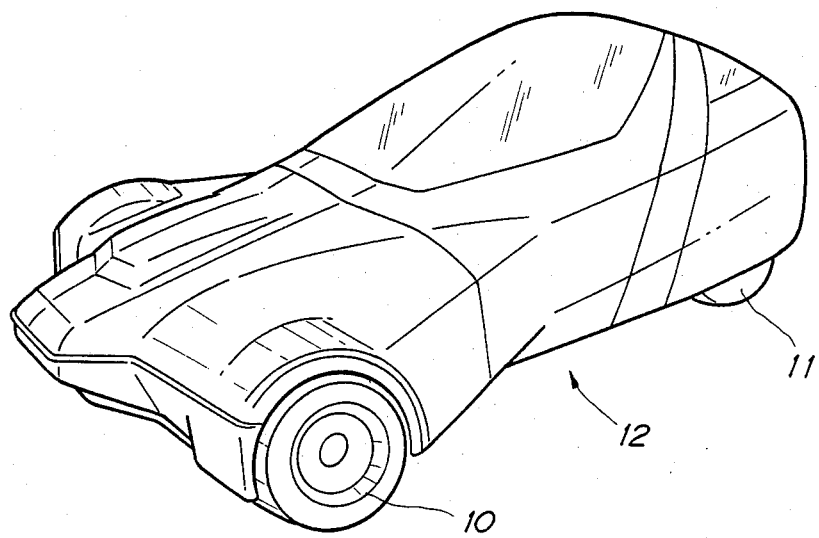
FIG. 1 is a perspective view of a three-wheeled vehicle according to a preferred embodiment of the present invention.
Figure 2:
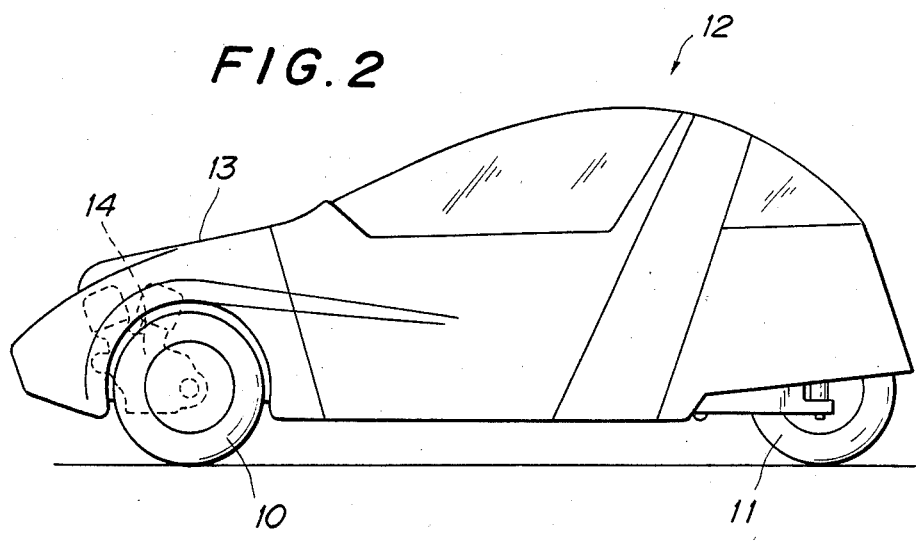
FIG. 2 is a side view of the three-wheeled vehicle in FIG. 1.

FIGS. 1 and 2 show a three-wheeled motor vehicle according to the present invention, which has a pair of front wheels 10 laterally spaced with each other and a single rear wheel 11. The front wheels 10 are respectively supported to an automotive body 12 through independent suspensions (not shown). An engine room 13 is provided in the front of the body 12, and an engine 14 is mounted in the engine room 13.

A power unit for transmitting power from the engine 14 to the front wheels 10 is constructed as follows. The engine 14 contains a clutch, a speed change gear mechanism and a differential mechanism. As shown in FIG. 3, the power from the engine 14 is transmitted from output shafts 15 of the differential mechanism through constant speed joints 16 to the right and left front wheels 10. Since the three-wheeled vehicle is thus constructed, the front wheels 10 are driven by the power of the engine 10 so as to run the vehicle.

As shown in FIGS. 3 and 4, the three-wheeled vehicle has a rear wheel servo mechanism 18 which cooperates with a front wheel steering mechanism 17 for displacing the rear wheel substantially laterally to the vehicle body in the direction opposite to the steering direction of the front wheels. The front wheel steering mechanism 17 has a pair of knuckle arms 19, a tie-rod 20 for coupling the knuckle arms 19 to each other and a pitman arm 21 for coupling the tie-rod 20 to a conventional steering gear (not shown). The front wheel steering mechanism may be altered to a center arm type, cross link type or any other known type. The pitman arm 21 is formed as a bell-crank, and is coupled at the intermediate part to an output shaft 22 of the steering gear. The pitman arm 21 is further connected at the end of one arm 21a thereof to the tie-rod 20 and at the end of the other arm 21b thereof through an operation rod 23 to the rear wheel servo mechanism 18 which also has a function as a rear suspension.

The rear wheel servo mechanism 18 has a linkage consisting of a trailing arm 24, a pair of rear forks 25 and a rear axle 26, and a suspension unit 27 for supporting the trailing arm 24. More particularly, the trailing arm 24 is vertically swingably coupled to a bracket 29 through a pivotal shaft 28 extending horizontally, which bracket 29 is formed integrally with the rear of the body 12. The trailing arm 24 is supported at the rear end thereof to the rear of the body 12 through the suspension unit 27 having a coiled spring 30 and a shock absorber 31. The rear forks 25 are pivotally secured at the front ends thereof to the trailing arm 24 through front pins 32 extending substantially vertically so as to be horizontally swingable, and pivotally secured at the rear ends thereof to both ends of the rear axle 26 through rear pins 33 extending substantially vertically. The rear wheel 11 is rotatably carried on the rear axle 26.

It is noted that a distance between the pair of right and left front pins 32 is equal to that between the pair of the rear pins 33 so that the direction of the rear wheel 11 is always held in the longitudinal direction of the body upon a lateral displacement thereof. Further, it is also to be noted that the size of the elements of the front wheels steering mechanism 17 are set so as to satisfy an Ackerman-Jeantaud's theory in which the extension lines of the axes of rotation of the front axles 10 and the extension line of the axis of rotation of the rear axle 11 are always crossed at one point irrespective of the steering angle when the vehicle is turned.

The above-described rear servo mechanism 18 is operatively coupled to the front wheel steering mechanism 17 as follows. One of the rear forks 25 is provided with a bracket 34 to which one end of the operation rod 23 is coupled through a pin joint. The other end of the operation rod 23 is coupled through a pin joint to one arm of the above-described bell-crank (pitman arm 21) of the front wheel steering mechanism 17.

The operation of the steering of the three-wheeled vehicle thus constructed will now be described. The pitman arm 21 is rotated through a steering gear by the operation of a steering wheel. The pitman arm 21 serves to steer the front wheels through the tie-rod 20 coupled thereto. The rear wheel servo mechanism is operated by the rod 23 which is also coupled to the pitman arm 21, so that the rear wheel is displaced substantially laterally with respect to the vehicle body. When the front wheels are steered to the right and left, the rear wheel is steered to the left and right, respectively. In other words, the steering direction of the front wheels and the direction of the displacement of the rear wheel are opposite to each other. The attitude of the front and rear wheels in case that the front wheels are steered to the left is shown by phantom lines in FIG. 3.

Accordingly, when the three-wheeled vehicle is turned, the rear wheel is displaced in the direction opposite to the turning direction of the vehicle, more particularly, to the outside of a turning circle, i.e., a circle drawn by the running locus of the vehicle. In other words, while the center of gravity (G) of the vehicle and the ground contacting point of the rear wheel are aligned in the center line of the vehicle body when the vehicle runs rectilinearly, the center of gravity is rendered to be nearer to the center of the turning circle than the ground contacting point of the rear wheel is when the vehicle is turned. Accordingly, this three-wheeled vehicle can turn on a curved road of smaller radius as compared with the conventional three-wheeled vehicle which has a stationary rear wheel.

The present invention has another advantage as follows. In any conventional vehicle, the load applied to the outside wheel relative to the turning circle is greater than that of the inside wheel during turning, so that the vehicle tends to roll over at high speeds. The factors contributing to the stability or rolling characteristics are very complex and interdependent so that it is not satisfactory to simply state that any change makes a vehicle more or less stable but there are some factors that are usually desirable. For example, a low center of gravity is desirable. Also, wider spacing of wheels may be helpful and the tire characteristics have an influence. In the three-wheeled vehicle of the present invention, the load applied to the inside front wheel and that to the outside front wheel are increased and decreased, respectively, by the lateral displacement of the rear wheel, when the wheels are turned and the vehicle is at rest. As the speed of the turning vehicle is increased this weight shift will decrease but it is believed that it will improve the turning characteristics over at least some range of speeds. Further, it is believed this will assist the performance of the independent suspensions of the front wheels.

FIG. 5 shows a modification of the above mentioned embodiment of the present invention, in which the same reference numerals indicate the same or corresponding parts and components in FIG. 3. In this modified embodiment of the invention, the distance between the pair of right and left rear pins 33 for coupling the rear ends of a rear forks 125 to respective ends of a rear axle 26 is shorter than the distance between the pair of right and left front pins 32 for coupling the front ends of the rear forks 125 to the trailing arm 24, whereby the rear wheel 11 is caused to angularly pivot to the right and left in response to the swinging movements of the rear forks 125 to the right and left, respectively. The other components of the above-described embodiment of FIGS. 3 and 4 are not modified so that the steering direction of the front wheels is opposite to the direction of the angular pivoting of the rear wheel 11.

An operation of this modified embodiment will now be described. Since the rear wheel 11 is angularly pivoted toward the moving direction of the rear wheel 11 when the rear wheel 11 is displaced toward the outside of the turning circle of the three-wheeled vehicle, the rear wheel 11 can be displaced with less force. The forces acting on the steering wheel, steering gear, pitman arm 22, operation rod 23 and the rear forks 125 can be remarkably moderated, and the vehicle can be more easily steered than the embodiment of FIG. 3. The attitude of the front and rear wheels when the front wheels are steered to the left is shown by phantom lines in FIG. 5.

In the embodiment and the modified embodiment described above, the side displacement amount of the rear wheel 11 is controlled by a mechanical linkage in response to the steering angle of the front wheels 10. However, the rear wheel 11 may be displaced by a hydraulic system or an electric system.

Further, although each of the vehicles of the embodiment and the modified embodiment described above has two front wheels 10 and one rear wheel 11, the present invention may also be applied to a vehicle which has one front wheel and two rear wheels, and the same features and advantages of the vehicle of the present invention can be provided in such a case. In such an embodiment, in the dispositions shown in FIGS. 3 and 5, the front wheels 10 are regarded as being rear wheels 10, the rear wheel 11 as a front wheel 11 and the trailing arm 24 of the rear wheel as the leading arm 24 of the front wheel 11.

With respect to the modified embodiment of the invention, when it is made such that the rear wheel 11 thereof is pivoted and displaced by a hydraulic or electric system, the rear wheel may be first angularly pivoted with a different mounting and control, and then displaced laterally with the aid of the side force produced by the angular pivoting of the rear wheel.

Further, although in the vehicle of the modified embodiment described above both the pivot angle and the lateral displacement of the rear wheel are determined in response to the steering angle of the front wheels, they may be determined in response to the vehicle speed, longitudinal or lateral acceleration of the vehicle, or angular speed of the steering operation.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

What is claimed:
1. A three-wheeled vehicle comprising:
   a pair of right and left wheels provided at either the front end or the rear end of the vehicle body, said pair of wheels being spaced from each other laterally with respect to said vehicle body;
   a single wheel provided at the other end of said vehicle body;
   a steering mechanism for steering said pair of wheels; and means adapted to cooperate with said steering mechanism for displacing said single wheel substantially laterally with respect to said vehicle body in a controlled amount of lateral displacement depending on the degree of steering and in the direction opposite to the direction of turning of the vehicle caused by the steering operation of said steering mechanism.

2. A three-wheeled vehicle according to claim 1, wherein:

said pair of wheels comprise a pair of front wheels and said single wheel comprises a rear wheel.

3. A three-wheeled vehicle according to claim 2, wherein:

said means adapted to cooperate with said steering mechanism is adapted for causing angular pivoting of said rear wheel in response to the steering angle of said front wheels and in the direction opposite to the steering direction of said front wheels.

4. A three-wheeled vehicle comprising:

a pair of right and left front wheels provided at the front end of the vehicle body, said pair of wheels being spaced from each other laterally with respect to said vehicle body;

a single wheel provided at the rear end of said vehicle body;

a steering mechanism for steering said pair of front wheels;

means adapted to cooperate with said steering mechanism for displacing said single wheel substantially laterally with respect to said vehicle body and in the direction opposite to the direction of turning of the vehicle caused by the steering operation of said steering mechanism;

said means including a trailing arm vertically swingably coupled at the front end thereof to said vehicle body, a pair of fork members horizontally swingably secured at the front end thereof to said trailing arm, and a rear axle pivotally secured at both ends thereof to the rear ends of said fork members and supporting said rear wheel; and said steering mechanism and said means are interconnected with each other through an operation rod which has one end thereof connected to one of said fork members and the other end thereof operatively connected to said steering mechanism.

5. A three-wheeled vehicle according to claim 1, wherein:

said pair of wheels comprise a pair of rear wheels and said single wheel comprises a front wheel.

6. A three-wheeled vehicle according to claim 5, wherein:

said means adapted to cooperate with said steering mechanism is adapted for causing angular pivoting of said front wheel in response to the steering angle of said rear wheels and in the direction opposite to the steering direction of said rear wheels.

7. A three-wheeled vehicle comprising:

a pair of right and left rear wheels provided at the rear end of the vehicle body, said pair of wheels being spaced from each other laterally with respect to said vehicle body;

a single wheel provided at the front end of said vehicle body;

a steering mechanism for steering said pair of rear wheels;

means adapted to cooperate with said steering mechanism for displacing said single wheel substantially laterally with respect to said vehicle body and in the direction opposite to the direction of turning of the vehicle caused by the steering operation of said steering mechanism;

said means including a leading arm vertically swingably coupled at the rear end thereof to said vehicle body, a pair of fork members horizontally swingably secured at the rear end thereof to said leading arm, and a front axle pivotally secured at both ends thereof to the front ends of said fork members and supporting said front wheel; and said steering mechanism and said means are interconnected with each other through an operation rod which has one end thereof connected to one of said fork members and the other end thereof operatively connected to said steering mechanism.

8. A three-wheeled vehicle according to claim 4, wherein, the distance between the front ends of said fork members is greater than the distance between the rear ends of said fork members for causing angular pivoting of said rear wheel in response to the steering angle of said front wheels and in the direction opposite to the steering direction of said front wheels.

9. A three-wheeled vehicle according to claim 7, wherein, the distance between the rear ends of said fork members is greater than the distance between the front ends of said fork members for causing angular pivoting of said front wheel in response to the steering angle of said pair of rear wheels and in the direction opposite to the steering direction of said rear wheels.

* * * * *